United States Patent [19]

Dinger et al.

[11] 4,207,848
[45] Jun. 17, 1980

[54] CHARGING AIR HEAT-EXCHANGER INSTALLATION

[75] Inventors: Hans Dinger; Herbert Deutschmann, both of Friedrichshafen, Fed. Rep. of Germany

[73] Assignee: Motoren-und Turbinen-Union Friedrichshafen GmbH, Friedrichshafen, Fed. Rep. of Germany

[21] Appl. No.: 825,040

[22] Filed: Aug. 16, 1977

[30] Foreign Application Priority Data

Sep. 10, 1976 [DE] Fed. Rep. of Germany ....... 2640732

[51] Int. Cl.² ............................................ F02M 31/00
[52] U.S. Cl. .................................. 123/122 D; 60/599
[58] Field of Search ...................... 123/122 D; 60/599

[56] References Cited

U.S. PATENT DOCUMENTS

| | | | |
|---|---|---|---|
| 3,450,109 | 6/1969 | Gratzmuller | 123/122 D |
| 3,473,522 | 10/1969 | Bailey | 123/122 D |
| 3,595,013 | 7/1971 | Brille | 60/599 |
| 3,794,007 | 2/1974 | Hardenberg | 123/122 D |

*Primary Examiner*—Ronald H. Lazarus
*Attorney, Agent, or Firm*—Craig & Antonelli

[57] ABSTRACT

A heat-exchanger system for the charging-air of a low-compression reciprocating piston internal combustion engine operating with exhaust gas turbo-supercharging, which is equipped with a first charging-air-water heat-exchanger that during the starting and partial load operation supplies the heat energy of a heater device to the charging air and which can be connected to the cooling water circulation of the internal combustion engine, and with a second charging-air-water heat-exchanger which is connected to the cooling water circulation external to the engine; the two charging-air-water heat-exchangers are thereby adapted to be traversed in parallel by the charging-air while a control system enables a stepless control of the charging air flow through the individual heat-exchangers as a function of the temperature of the charging air upstream of the cylinders and of the operating condition of the internal combustion engine.

23 Claims, 1 Drawing Figure

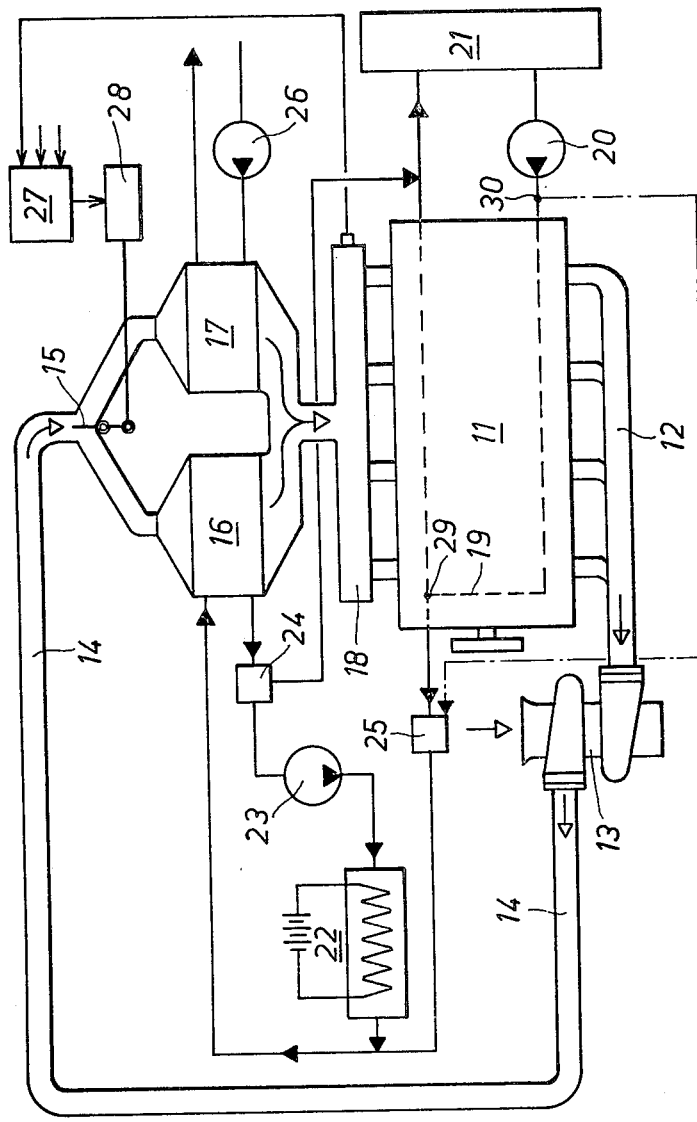

CHARGING AIR HEAT-EXCHANGER INSTALLATION

The present invention relates to a heat-exchanger installation for the charging-air of a low-compression piston internal combustion engine operating with exhaust gas supercharging and including a first charging-airwater heat-exchanger which during the start and partial load operation supplies the heat energy of a heating installation to the charging air and which can be connected to the cooling water circulation of the internal combustion engine, and a second charging-air-water heat-exchanger which is connected with a cooling water circulation system external to the engine.

The aim of such heat-exchanger installations is to so prepare temperature-wise the charging air supplied from the compressor to the internal combustion engine that for each operating condition of the internal combustion engine, favorable prerequisites for the ignition and the combustion progress of the charge in the cylinders are assured.

It is known from the German Pat. No. 1,451,887 to couple the charging-air cooler with a preheating apparatus and with the cooling circulation of the internal combustion engine. The control of the charging-air temperature provided thereat, however, takes place too slowly for the rapid load change occurring in internal combustion engines because at every charging-air temperature change demanded by the temperature sensors or other types of sensors indicating the load condition of the internal combustion engine, at first the temperature of the water quantity of the charging air cooling circulation has to be changed which necessarily requires a certain amount of time. Additionally, for high-powered internal combustion engines a more intensive cooling of the charging air is desirable at full-load operation than can be achieved with the recooling of the cooling water by the ambient air.

It is also known to cool the charging air by way of a cooling circulation system external to the engine. However, the warm-up of the charging-air for the start and partial load operation is thereby problematical because the external cooling water is available for the most part with low temperatures and additionally a heating of this natural water cannot be carried out by reason of the precipitations connected therewith.

It is the aim of the present invention to utilize the advantages of the two known charging-air cooling possibilities and to achieve thereby a fine-sensitive control of the charging-air temperature which is effective directly in dependence on the load or the operating condition of the internal combustion engine.

The underlying problems are solved in that the two charging-airwater heat-exchangers are traversed in parallel by the charging air and in that a control installation is provided which permits a stepless control of the charging air throughflow through the individual heat-exchangers in dependence on the operating temperature of the charging-air ahead of the cylinders and on the operating condition of the internal combustion engine.

It is possible with such an installation to warm-up the charging air for the starting and partial load operation of the internal combustion engine by means of a small and therewith rapidly heatable water quantity and with increasing output to utilize the wasted heat of the internal combustion for the charging air warm-up or to cool the charging air by way of the cooler or radiator of the internal combustion engine and to achieve at full-load operation a completely satisfactory charging-air cooling by the cooling water circulation system external to the engine.

The magnitude of the charging air temperature can thereby be matched steplessly and without delay to the requirements for completely satisfactory combustion of the charge in the cylinders.

Accordingly, it is an object of the present invention to provide a charging-air heat-exchanger installation which avoids by simple means the aforementioned shortcomings and drawbacks encountered by the prior art.

Another object of the present invention resides in a charging-air heat-exchanger system which is capable of rapidly matching the charging-air temperature to the changes in the load of the engine or operating conditions thereof.

A further object of the present invention resides in a charging-air heat-exchanger system which eliminates an undesired lag in the response thereof to changes in the load or operating conditions of the engine.

A further object of the present invention resides in a charging-air heat-exchanger installation which can be regulated steplessly by simple means, yet permits the adaptation of the charging-air temperature in a completely satisfactory manner and without delay to the requirements for a completely satisfactory combustion of the charge in the cylinders under all engine operating conditions.

These and other objects, features and advantages of the present invention will become more apparent from the following description when taken in connection with the accompanying drawing which shows, for purposes of illustration only, one embodiment in accordance with the present invention, and wherein;

The single FIGURE is a schematic view of a charging-air heat-exchanger system in accordance with the present invention.

Referring now to the single figure of the drawing, the exhaust gases of a piston internal combustion engine 11 are fed to an exhaust gas turbocharger 13 by way of an exhaust gas line 12. The compressed charging air is conducted by way of a line 14, a control installation 15, a first charging-air-water heat-exchanger 16 or a second charging-air-water heat-exchanger 17 to a charging air line 18 and is fed from there to the individual cylinders of the internal combustion engine.

A cooling water circulatory system 19 is maintained by a pump 20 driven by the internal combustion engine. A cooler or radiator 21 serves for the removal of the lost heat quantities produced in the internal combustion engine to the ambient air.

A small water quantity in a water circulatory through the charging-air-water heat-exchanger 16 can be heated up by way of a heating device 22 operated in the illustrated embodiment by electrical energy and may warm-up the charging-air during the starting and partial load operation. The water circulation is maintained by a pump 23.

The charging-air-water heat-exchanger 16 may be connected with the cooling water circulatory system 19 by way of solenoid valves 24 and 25. Depending on the arrangement of the branching place in the coolingwater circulatory system 19, either a warm-up or a cooling of the charging-air can be realized by means of the charging-air-water heat-exchanger 16. If, for example, the branching is undertaken at the place 29 of the cooling water circulatory 19, then the charging-air-water heat-exchanger 16 receives water with an average temperature of the cooling water circulatory 19 and the charging air can be heated up. With an arrangement of the branching at the place 30 of the cooling-water circulatory system 19, the charging-air-water heat-exchanger 16 receives cooled water. As a result thereof, also the charging-air is cooled. The valve 25 may be of suitable, known construction to achieve such alternate operation of the branching places.

At full-load operation, the cooling of the charging air is realized by the charging-air-water heat-exchanger 17 acted upon with external cooling water circulation. The external cooling water circulation is maintained by a pump 26.

The control of the regulating installation 15 for the charging-air takes place by a control unit 27 and by an adjusting motor 28 in dependence on the temperature in the charging-air line 18 and on the operating condition of the internal combustion engine. The solenoid valves 24 and 25 as well as the pumps 23 and 26 may also be controlled by means of the control unit 27 corresponding to the requirements of the internal combustion engine 11, so that a fully automatic operation of the charging air regulation is possible. Since the details of the control unit 27 involve conventional parts, known as such in the prior art, a detailed description thereof is dispensed with herein for the sake of simplicity.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A heat-exchanger system for the charging-air of a low-compression cylinder piston internal combustion engine operating with exhaust gas turbo-supercharging, comprising a first charging-air-water heat-exchanger means which supplies to the charging air the heat energy of a heating means during start and partial load operation and which is operable to be connected with a cooling water circulation of the internal combustion engine, and a second charging-air-water heat-exchanger means which is operable to be connected with a cooling water circulation external of the engine, characterized in that the two charging-air-water heat-exchanger means are operable to be traversed in parallel by the charging air, and in that control means are provided which enable a control of the charging air throughflow through the individual heat-exchanger means in dependence on at least one of the temperature of the charging-air ahead of the cylinders and of the operating condition of the internal combustion engine.

2. A heat-exchanger system according to claim 1, characterized in that said control means provides a stepless control of the throughflow of the charging air through the individual heat-exchanger means.

3. A heat-exchanger system according to claim 1, characterized in that the control means is operable to control the throughflow of charging air through the individual heat-exchanger means in dependence on the temperature of the charging air ahead of the cylinders and on the operating condition of the internal combustion engine.

4. A heat-exchanger system according to claim 1, with an exhaust gas turbocharger means and an intake manifold, characterized in that an output of the exhaust gas turbocharger means is operatively connected by way of line means with the two heat-exchanger means, said control means including valve means for selectively controlling the flow from the output of the exhaust gas turbocharger means to the heat-exchanger means connected in parallel between said valve means and the intake manifold.

5. A heat-exchanger system according to claim 4, with a water circulatory means, characterized in that the first charging-air-water heat-exchanger means is connected with the water circulatory means, the water circulatory means includes a pump and a heating means for heating the water thereof.

6. A heat-exchanger system according to claim 5, with an engine water-cooling circulatory system, characterized in that said water circulatory means includes a first valve means for selectively connecting an outlet of the first charging-air-water heat-exchanger means with the pump or with the engine water-cooling circulatory system.

7. A heat-exchanger system according to claim 6, with a cooler provided in the engine water-cooling circulatory system, characterized in that said first valve means is operable to selectively connect the outlet of the first charging-air-water heat-exchanger means with the pump or with the engine water-cooling circulatory system at a position intermediate the engine and the cooler.

8. A heat-exchanger system according to claim 7, characterized in that a second valve means is provided in the water circulatory means downstream of the pump thereof, said second valve means selectively operatively connects the first-charging-air-water heat-exchanger means with the engine water-cooling circulatory system.

9. A heat-exchanger system according to claim 8, characterized in that said second valve means is operable to selectively connect the water circulatory means at a point downstream of the heating means and upstream of an inlet of the first charging-air-water heat-exchanger means with the engine water-cooling circulatory system at a point upstream or downstream of the cooler thereof.

10. A heat-exchanger system according to claim 9, characterized in that said first and second valve means are controlled by said control means.

11. A heat-exchanger system according to claim 10, characterized in that the control means is operable to control the throughflow of charging-air through the individual heat-exchanger means in dependence on the temperature of the charging air ahead of the cylinders and on the operating condition of the internal combustion engine.

12. A heat-exchanger system according to claim 11, characterized in that said control means provides a stepless control of the throughflow of the charging-air through the individual heat-exchanger means.

13. A heat-exchanger system according to claim 1, with a water circulatory means, characterized in that the first charging-air-water heat-exchanger means is connected with the water circulatory means, the water circulatory means includes a pump and a heating means for heating the water thereof.

14. A heat-exchanger system according to claim 13, with an engine water-cooling circulatory system, characterized in that said water circulatory means includes a first valve means for selectively connecting an outlet of the first charging-air-water heat-exchanger means with the pump or with the engine water-cooling circulatory system.

15. A heat-exchanger system according to claim 14, with a cooler provided in the engine water-cooling circulatory system, characterized in that said first valve means is operable to selectively connect the outlet of the first charging-air-water heat-exchanger means with the pump or with the engine water-cooling circulatory system at a position intermediate the engine and the cooler.

16. A heat-exchanger system according to claim 14, characterized in that a second valve means is provided in the water circulatory means downstream of the pump thereof, said second valve means selectively operatively connects the first charging-air-water heat-exchanger means with the engine water-cooling circulatory system.

17. A heat-exchanger system according to claim 16, characterized in that said second valve means is operable to selectively connect the water circulatory means at a point downstream of the heating means and upstream of an inlet of the first charging-air-water heat-exchanger means with the engine water-cooling circulatory at a point upstream or downstream of the cooler thereof.

18. A heat-exchanger system according to claim 16, characterized in that said first and second valve means are controlled by said control means.

19. A heat-exchanger system for charging-air of a low compression cylinder-piston internal combustion engine, the heat-exchanger system including a first heat-exchanger means adapted to be connected to a coolant circulatory system of the internal combustion engine, and a second heat-exchanger means adapted to be connected to an external coolant circulatory system, characterized in that the first and second heat-exchanger means are arranged in parallel to each other, and in that means are provided for controlling a flow of the charging-air through the individual heat-exchanger means in dependence upon at least one of a temperature of the charging-air ahead of the cylinders and an operating condition of the internal combustion engine.

20. A heat-exchanger system according to claim 19, with an engine coolant circulatory system, characterized in that means are provided for communicating the first heat-exchanger means with two points of the engine coolant circulatory system with coolant at one of the two points being at a higher temperature than at the other of the two points, and in that means are provided for controlling said communicating means such that said first heat-exchanger means is operable to either warm or cool the charging-air.

21. A heat-exchanger system according to claim 20, with an external coolant circulatory means, characterized in that means are provided for communicating said second heat-exchanger means with the external coolant circulatory means so that said second heat-exchanger means cools the charging-air.

22. A heat-exchanger system according to claim 21, with an additional coolant circulatory means, characterized in that means are provided for communicating said first heat-exchanger means with said additional coolant circulatory means, and in that the additional coolant circulatory means includes a heating means for heating a coolant thereof.

23. A heat-exchanger system according to claim 19, with an engine coolant circulatory means and an additional circulatory means, characterized in that means are provided for communicating the engine coolant circulatory means and the additional circulatory means with the first heat-exchanger means, and in that means are provided for selectively controlling a flow of coolant from the engine coolant circulatory means and the additional circulatory means to the first heat-exchanger means.

* * * * *